United States Patent [19]

Harshaw

[11] Patent Number: 4,696,012

[45] Date of Patent: Sep. 22, 1987

[54] TUNABLE MULTILINE/MULTIBAND LASER

[75] Inventor: Robert C. Harshaw, Dallas, Tex.

[73] Assignee: Texas Instruments Incorporated, Dallas, Tex.

[21] Appl. No.: 743,545

[22] Filed: Jun. 11, 1985

[51] Int. Cl.[4] ............................................. H01S 3/08
[52] U.S. Cl. ...................................... 372/99; 372/102
[58] Field of Search ............................ 372/99, 98, 102

[56] References Cited

U.S. PATENT DOCUMENTS

| Re. 29,421 | 9/1977 | Scott | 372/99 |
| 4,438,517 | 3/1984 | Bobb et al. | 372/99 |

Primary Examiner—Gene Wan
Attorney, Agent, or Firm—Richard K. Robinson; James T. Comfort; Melvin Sharp

[57] ABSTRACT

A tunable multiline/multiband laser includes a partial reflecting mirror, a gain control, a diffraction grating means, and a reflective mirror means. The reflective mirror means includes in a first embodiment a fabricated mirror which allows for any number of predetermined lines and combinations, which a second embodiment replaces the fabricated mirror with a material that is capable of changing its reflectivity upon changing its thermodynamic phase state. The diffraction grating means includes a grating and a lens to spatially separate initially parallel rays of different wavelengths originating from the gain cell and project the spectrum onto the surface of the mirror means. The mirror means includes a mirror constructed to normalize the round trip gain to each frequency component. The normalization is accomplished by proper choice of reflectivities at the focal point of each wavelength upon the mirror. The mirror consists of a nonreflecting substrate having either a plurality of equal size reflective areas selectively coated to vary their reflectivity or of different sizes to vary their reflectivity to equalize the round trip gain for lasing. The reflective areas can also be formed using a thin film of phase transition material and a heating means such as an electron beam gun or heating elements formed in the surface of a silicon substrate polished to optical flatness.

14 Claims, 10 Drawing Figures

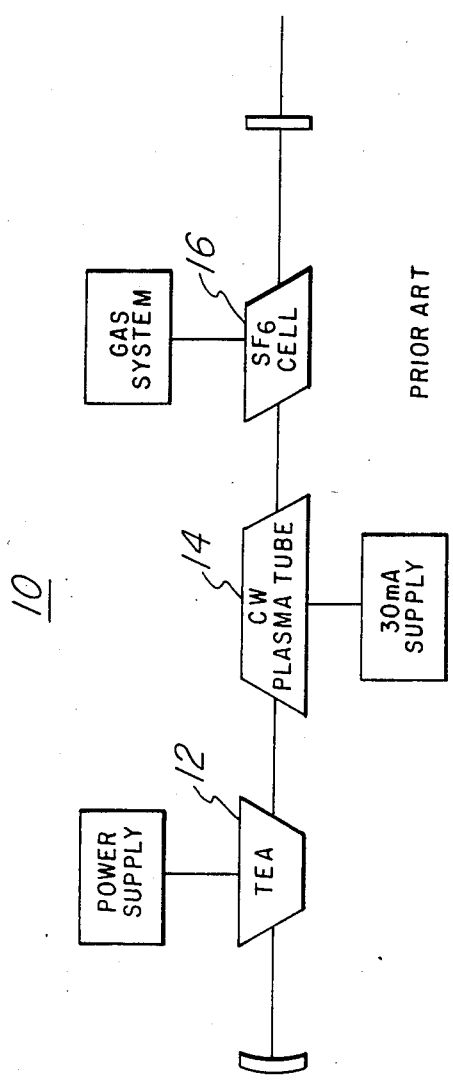
Fig. 1 PRIOR ART
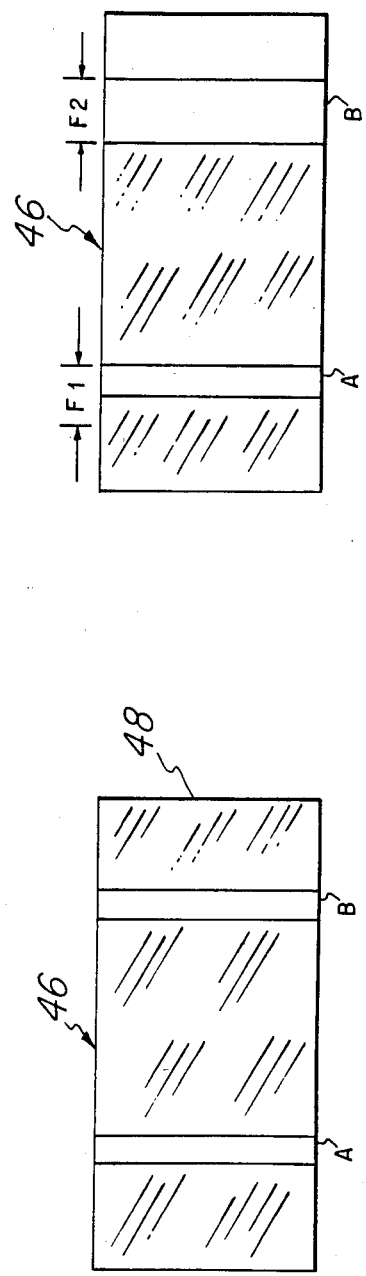
Fig. 3a
Fig. 3b

TUNABLE MULTILINE/MULTIBAND LASER

BACKGROUND OF THE INVENTION

1. Field of the Invention

This invention relates to lasers and more particularly to a tunable multiline/multiband laser resonator.

2. Description of Related Art

Laser systems based primarily on molecular gases have many discrete vibrational rotational transitions upon which laser action can be made to occur. While $CO_2$ lasers will be used throughout, those skilled in the art will recognize the concepts are applicable to other gases (CO, NH3), excimers, solid state materials and organic dyes.

In $CO_2$, the upper and lower laser levels responsible for the 10.6 micrometer band emission are the (001) and the (100) vibrational states, respectively, each of which have many rotational components. Lasing occurs from a single rotational component J' of (100) according to the Quantum Mechanical selection rules:

$$dJ = +1, -1, 0$$

and $$J' = 0 \leftarrow \| \rightarrow J'' = 0$$

In a broad band resonator, a single transition will dominate generally over all others, the transition for which there is the highest gain [P(20) of the 10.6 micron band]. As the rotational levels are tightly coupled, the levels not participating in the laser action redistribute themselves in an attempt to maintain a Boltzman like distribution as the population of $J=19$ is reduced by stimulated emission. If during lasing equilibrium is established, a large fraction of the energy stored in all of the high J value rotational states of the upper vibrational level will be effectively funneled into the single lasing rotational level. The relaxation of the rotational levels is in part responsible for the high efficiency of the $CO_2$ laser.

For proper laser target interaction, it was believed that for $CO_2$ fusion lasers nanosecond pulses were necessary. Q-switched TEA lasers were capable of such pulse lengths but inefficient. The (001) relaxation rates were not fast enough to couple any significant amount of energy from the rotational manifold to a single rotational level on such a short time scale [G. T. Schappert, Appl. Phys. Lett., 23, 319, (1973); B. J. Feldman, IEEE J. Quantum Electron, QE-9, 1070 (1973): K. Smith and R. M. Thomson, *Computer Modeling of Gas Lasers*, Plenum Press, New York, 1978, pp. 136-154.: E. P. Velikhov, *Molecular Gas Lasers*, MIR Publishers, Moscow, 1981, pp 214-225.] Then it was found that more efficient operation occurred when output from several transitions simultaneously was encouraged and the multiband oscillator at the 10.6 micron band was developed [H. Baumbacker and R. S. Long, Phys. Lett., 47A, 429 (1974)] and followed by the development of simultaneous emission at the 10.6 micron and 9.4 micron bands [J. F. Figueria and H. D. Sutphin, Appl. Phys. Lett., 25, 661 (1974)]. Although the total pulse energy for these multiling oscillators waws increased, the output on any given line ase decreased compared to single frequency emission.

A master and slave oscillator array was developed for a directed energy weapon; this system though suitable for preselected v-J multiline oscillation is too costly and inefficient for use in smaller inexpensive resonators and impractical for use on many v-J transitions.

In other applications, such as, for example, remote chemical detection, the laser is required to transmit a variety of wavelengths corresponding to absorption bands of the chemical species which is to the detected. If the nature of the chemical species is unknown prior to the measurement, then the laser must be scanned across a large number of output wavelengths to identify the absorption signature of the unknown species.

Presently, in differential absorption LIDAR (DIAL) applications a single laser is scanned as rapidly as possible, and the output is seen as a series of pulses at different wavelengths. To increase the data collection rates, multiple lasers are incorporated into a single device which would then be capable of rapid multiple wavelength emission. [J. L. Bufton, T. Itabe, and D. A. Grolemund, "Airborne Remote Sensing Measurements with a Pulsed $CO_2$ Dial System", *Optical and Laser Remote Sensing*, Springer Verlag, New York, 1983]. A disadvantage of such system is the requirement for independent power supplies, pulse forming networks, switching elements and resonators. Also, sophisticated circuitry is required to control the wavelength of each laser and to ensure the proper sequential firing of the independent lasers. Further disadvantages are the complexity, size and weight, and cost of the system.

SUMMARY OF THE INVENTION

Accordingly it is an object of this invention to provide a tunable multiline/multiband laser resonator to provide frequency agile multiline lasers capable of random access tuning at potentially high rates.

Another object of the invention is to provide a laser resonator for multiline operation which is efficient, and inexpensive, rugged and lends itself to computer control.

Yet another object of the invention is to provide a laser resonator having the capability of randomly selecting any number of lines and combination of lines for participation in laser oscillation.

Still another object of the invention is to provide a tuning device operating in the reflective mode as opposed to a transmissive mode for laser operation at different wavelengths.

A further object of the invention is to provide a resonator having a large gain volume fill factor for ensuring efficient energy extraction.

A further object of the invention is to provide a laser resonator which is compact, light, simple and inexpensive.

Briefly stated, the invention comprises a tunable multiline/multiband laser resonator which in a first embodiment which employs a fabricated mirror which allows for any number of predetermined lines and combinations, and in a second embodiment, a material which is capable of changing its reflectivity upon changing its thermodynamic phase state replaces the fabricated mirror.

Other objects and features of the invention will become more readily apparent from the following detailed description when read in conjunction with the accompanying drawings.

BRIEF DESCRIPTION OF THE DRAWINGS

FIG. 1 is a block diagram of a prior art multiband $CO_2$ laser oscillator;

FIGS. 3a and 3b are views of first and second multiband laser mirror embodiments;

DESCRIPTION OF PREFERRED EMBODIMENTS

Figure 2:
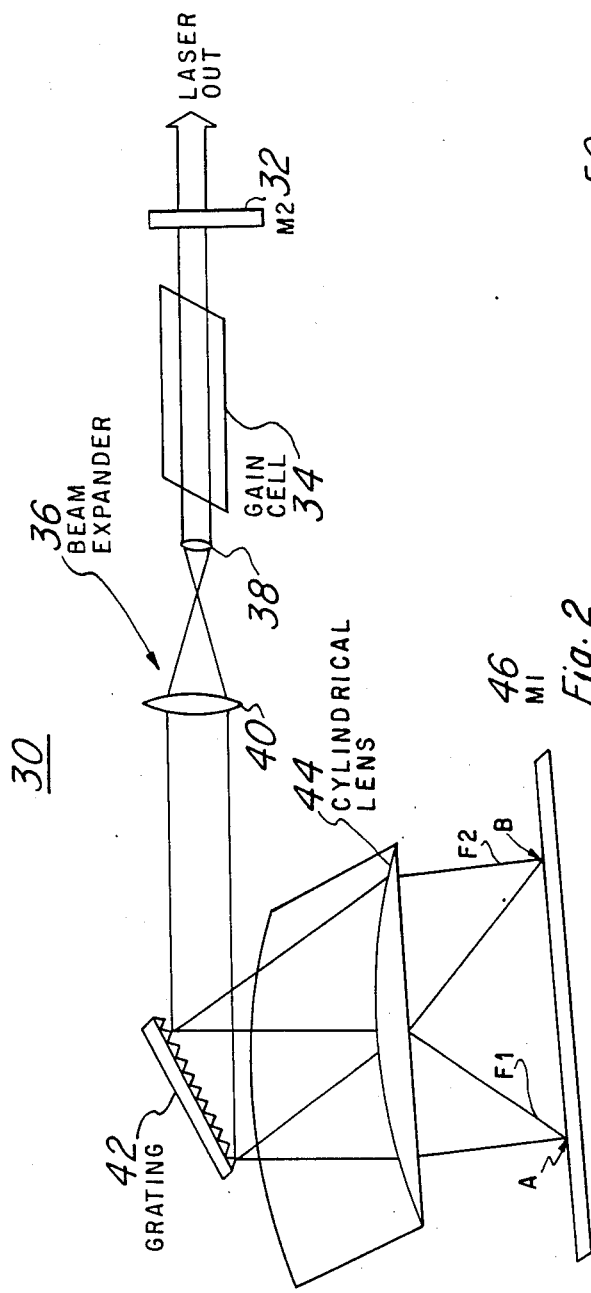
FIG. 2 is a block diagram of a predetermined multiband oscillator.

The prior art multiband $CO_2$ laser oscillator 10 (FIG. 1) includes as a gain medium a flashboard preionized TEA $CO_2$ laser 12 in series with a low pressure cw $CO_2$ discharge 14. The low pressure cw section, when operated below threshold, was found to eliminate the time dependent structure normally present in the gain switched TEA pulse due to longitudinal mode beating. The $SF_6$ cell 16 provides a frequency dependent intracavity loss which suppressed the normal P(20) (001-100) oscillation and equalized the gain of other vibrational-rotational transitions. Simultaneous oscillation was observed on the R(14), R(16) and R(18) lines of the 10.6 micron branch and the P(20) and P(22) lines of the 9.4 micron branch. The the R(16) and P(22) lines were found to be the most intense. The prior art device possess no frequency agility as the $SF_6$ cell is a completely passive element.

The predetermined multiband oscillator 30 of the present invention includes an optical path having from the laser output position a M2 mirror 32, a gain cell 34, a beam expander 36 including lenses 38 and 40, a grating 42, a cylindrical lens 44 and a M1 mirror 46.

In a first embodiment, the diffraction grating 42 and the lens 44 spatially separate initially parallel rays of different wavelengths originating from the gain cell 34 and project the spectrum onto the surface of the M1 mirror 46. As each wavelength is produced by a different transition and has a different small signal gain associated with it, the M1 mirror 46 is constructed so that it can normalize the round trip gain of each frequency component.

Normalization is accomplished, in this first embodiment, by selectively choosing the reflectivities at the focal point of each wavelength upon the M1 mirror 46. The beam expander 36 and the cylindrical lens 44 is to avoid laser damage to the diffraction grating and to the M1 mirror 46 at high intracavity circulating powers.

The M1 mirror 46 has two configurations (FIGS. 3a & 3b), The first (FIG. 3a) comprises a substrate having two reflective areas A and B. Area A is made less reflective than area B by the application of suitable coating material to area A, while the remainder of the substrate remains completely nonreflective. A suitable substrate material is zinc selenide. And the coating is a zinc selenide coating of preselected microns thickness on a germanium base to obtain a desired reflectivity percentage.

The second (FIG. 3b) differs from the first in that the need for the coating of Area A is eliminated by making the size of Area A less than the width of Area B to change the relative amounts of reflected light by Areas A and B. It will be appreciated by those skilled in the art that the rectangular spot sizes of all the components are the same and the spatially separated frequency components have been slightly defocused.

Thus, with light having a frequency F1 at a higher gain than light at a frequency F2 (FIG. 2), by making the reflectivity at position A (FIGS. 3a & 3b) less at position B, the overall round trip gain for each frequency can be made equal and both wavelengths will lase.

This concept of gain normalization can be extended to a large number of transitions simply by the proper placement and choice of widths of the reflective strips. However, owing to the finite energy available, only a fraction of the accessible transitions can be used simultaneously, the exact number depending upon the required energy per line (as determined by the application) and the available energy in the gain medium. Different wavelength sets are accommodated by the replacement of M1 mirror 46 with reflectivity structure. Many such coded mirrors could be mounted on the surface of a rotating disk or polygon to facilitate rapid exchange of mirror sets through some mechanical means such as a computer controlled stepper motor.

Figure 5:
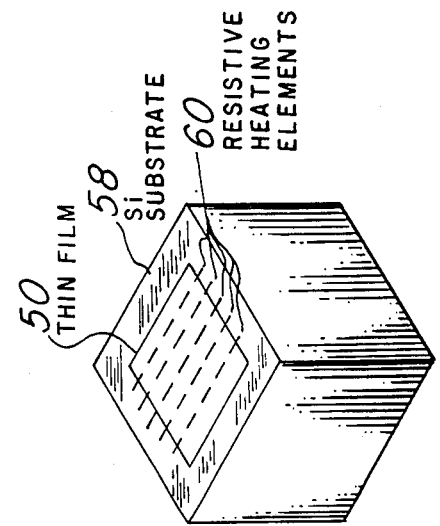
FIG. 5 is an isometric view of a resistive heated thin film of phase transition material.
Figure 4:
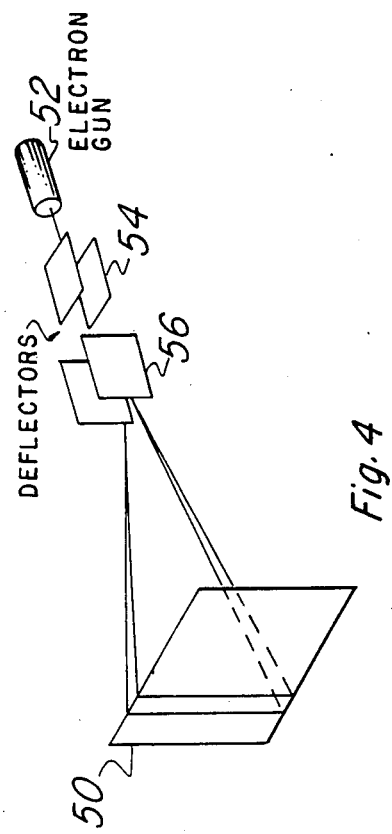
FIG. 4 is a block diagram of an electron beam heated thin film of phase transition material.

In a second embodiment (FIGS. 4 & 5), the multiline/multiband laser oscillator is that of FIG. 2, except the M1 mirror 46 has been replaced with a large area thin film of material such as, for example vanadium dioxide, which exhibits changes in reflectivity upon undergoing a thermodynamic phase transition. At cooler temperatures the state of the material is nonreflective; at temperatures beyond its critical value its state is highly reflective.

Thus, a thin film 50 (FIG. 4) of phase transition material is used in place of the mirror 46 (FIG. 2). An electron gun 52 having horizontal and vertical reflectors 54 and 56 generates both vertical and horizontal e-beam patterns, in much the same way as for the common CRT display. For the sake of clarity, only one pattern is shown; however, many such patterns, corresponding to different reflectivity structures, can be written onto the film under computer control.

In another version of the use of phase transition material (FIG. 5), a substrate 58 polished to optical flatness has a series of resistive heating elements 60 deposited thereon. The layer 50 of phase transition material is deposited over the heating elements and the remainder of the surface of the silicon substrate. By applying a current selectively to the heating elements, a variety of reflectivity structures can be produced. As the substrate can be placed in physical contact with a regulated thermal reservoir, the phase transition material can be maintained very near its critical temperature to improve the temporal response of a phase change.

Figure 6A:
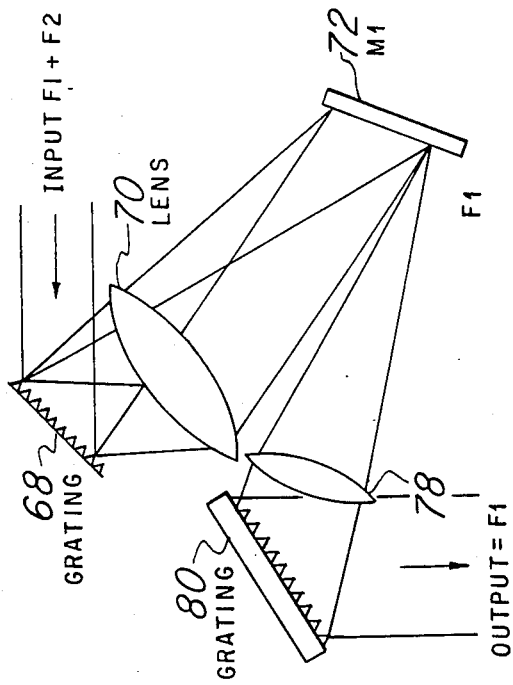
FIGS. 6a and 6b are diagrams of two curved phase transition material mirrors for a steering laser output.
Figure 6B:

Referring now to FIGS. 6a and 6b, the phase transition material mirror 62 can be formed into any conceived mirror geometry such as, for example, a spherical mirror. Resistor element or elements 64 are selectively positioned to be individually addressable pixels. The mirror 62 is then placed in a resonator with another spherical mirror to form a stable laser cavity. In this embodiment the laser output is steerable or pointable to different targets by changing the reflectivity pattern on the mirror.

Figure 7A:
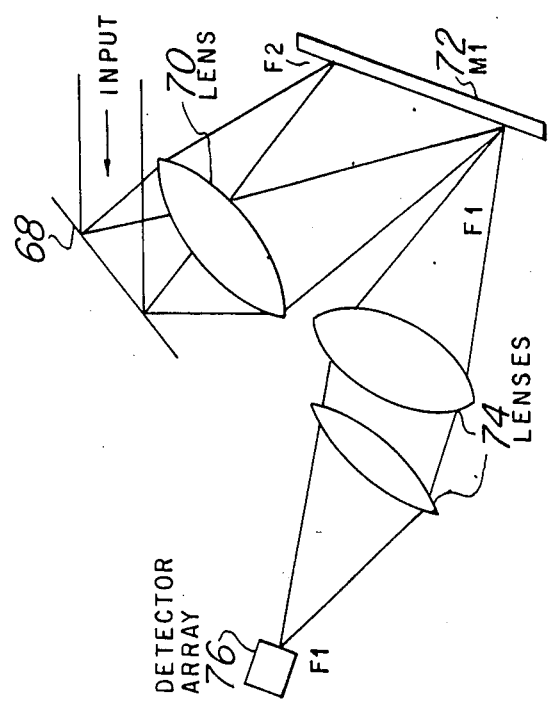
FIGS. 7a and 7b are views, respectively, of a filtering spectrometer and a frequency filtering visual imaging system.

Referring now to FIG. 7a, a filtering spectrometer includes a grating for splitting incoming radiation into its various frequency components. A lens 70 focuses the split radiation onto the mirror 72. Mirror 72 may be, for example, either a predetermined or phase transition type, depending upon the application and is slightly tuned so that the radiation is reflected through focusing lenses 74 onto a detector array 76.

Figure 7B:
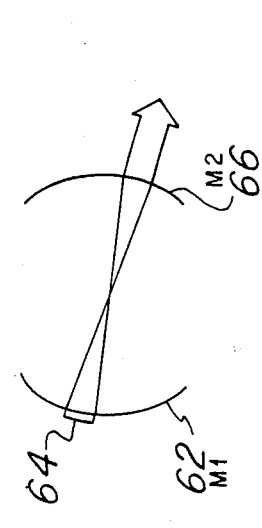

Referring now to FIG. 7b, a frequency filtering visual imaging system is provided by replacing the lenses 74 and detector array 76 (FIG. 7a) with a lens 78 and grating 80 combination where the radiation is recombined into the image without the unwanted frequency components.

Although several embodiments of the invention have been described, it will be apparent to a person skilled in the art that various modifications to the details of construction shown and described may be made without departing from the scope of this invention.

What is claimed is:

1. A tunable multiline/multiband laser comprising a partial reflecting mirror, gain cell, splitting means and a mirror means constituting an optical path, the splitting means for spatially separating initially parallel rays of different wavelengths originating from the gain cell and projecting the spectrum onto the surface of the mirror means operable for normalizing the round trip gain of each frequency component.

2. A tunable multiline/multiband laser according to claim 1 wherein the mirror means includes a plurality of reflective means at the focal points of the selected wavelengths on the mirror means.

3. A tunable multiline/multiband laser according to claim 2 wherein the plurality of reflective means have preselected reflectivities for varying the reflectivity whereby the overall round trip gain for each frequency is made equal for lasing.

4. A tunable multiline/multiband laser according to claim 3 wherein the plurality of reflective means comprises a supporting means, a plurality of selectively spaced reflective areas formed on said support means, a first reflective area being coated to provide a first area having a reflectivity less than the remaining reflective areas and all other areas of the supporting means being non-reflective.

5. A tunable multiline/multiband laser according to claim 3 wherein the plurality of reflective means comprises a supporting means, a plurality of spaced reflective areas formed on said supporting means, a first reflective area having a preselected area less in size as to the remaining reflective areas and all other areas of the supporting means being non-reflective.

6. A tunable multiline/multiband laser according to claim 2 wherein the plurality of the plurality of reflecting means constitutes a set and further including a plurality of set mounted on a common supporting means for facilitating rapid exchange of mirror sets having different wavelengths.

7. A tunable multiline/multiband laser according to claim 1 wherein the mirror means comprises a film of phase transition material and actuator means operatively connected to the film for phase changing.

8. A tunable multiline/multiband laser according to claim 7 wherein the film of phase transition material is vanadium dioxide.

9. A tunable multiline/multiband laser according to claim 7 wherein the actuator means is an electron beam gun for selectively heating areas of the film of phase transition material for forming reflective areas thereof.

10. A tunable multiline/multiband laser according to claim 7 wherein the actuator means includes a silicon substrate having a surface polished to optical flatness, a plurality of resistive heating elements formed in a linear pattern in the surface and the film of phase transition material on top of the surface in operative contact with the plurality of heating elements for forming reflective areas thereof.

11. A tunable multiline/multiband laser according to claim 7 wherein the film for phase changing has a preselected shape and the actuator means includes resistor heating elements.

12. A tunable multiline/multiband laser according to claim 11 wherein the film for phase changing has a spherical shape and the resistor elements selectively arranged whereby when placed in a resonator with another spherical mirror to form a stable laser cavity a laser is provided having a steerable output.

13. A tunable multiline/multiband laser according to claim 1 further including a focusing lens and a detector array, and wherein the mirror means including a plurality of selectively spaced reflective areas is positioned to reflect the radiation from a preselected reflective area through the focusing lens onto the detector array thereby forming a spectrometer.

14. A tunable multiline/multiband laser according to claim 1 further including a columnating lens and a grating in operative association with the columnating lens and wherein the mirror means including a plurality of selectively spaced reflective areas is positioned to reflect the radiation from a preselected reflective area through the columnating lens onto the grating for recombination of the radiation with preselected frequency components.

* * * * *